May 8, 1923.

E. J. TOMLINSON

PHONOGRAPH MOTOR

Filed May 20, 1920

INVENTOR
Edward J. Tomlinson
BY
Albion D. T. Libby
ATTORNEY

May 8, 1923.

E. J. TOMLINSON

PHONOGRAPH MOTOR

Filed May 20, 1920

INVENTOR
Edward J. Tomlinson
BY
A. D. T. Libby
ATTORNEY

Patented May 8, 1923.

1,454,195

UNITED STATES PATENT OFFICE.

EDWARD J. TOMLINSON, OF NEWARK, NEW JERSEY, ASSIGNOR TO SPLITDORF ELECTRICAL COMPANY, OF NEWARK, NEW JERSEY.

PHONOGRAPH MOTOR.

Application filed May 20, 1920. Serial No. 382,794.

*To all whom it may concern:*

Be it known that I, EDWARD J. TOMLINSON, a citizen of the United States, residing at Newark, in the county of Essex, State of New Jersey, have invented certain new and useful Improvements in Phonograph Motors, of which the following is a description, reference being had to the accompanying drawing, and to the figures of reference marked thereon.

This invention relates to electric motors and as illustrated is particularly adapted for phonograph purposes in playing a record in the form of a plate or disc.

In my application Serial No. 350,219 filed January 9, 1920 I have shown and described a motor in which the field structure is attached to the bottom of a stationary casing and in which the armature is fastened to the interior wall of another casing, telescopically mounted within the stationary casing and further in which the brush holder is carried by the stationary casing within the interior portion thereof. It is the principal object of my present invention to simplify and improve on the design and arrangement of the parts shown and described in the above mentioned application. In the said application the brush holder and brushes cannot be gotten at without taking off the cover plate and withdrawing the rotatable member. Similarly the commutator cannot be cleaned without taking out the rotatable member. It is one of the objects of this present invention to arrange the parts so that the brushes may be accessible without disturbing the other parts of the motor and in which the commutator may be accessible for the purpose of cleaning with little or no trouble.

Another object of my invention is to arrange the windings and electrical connections so that the parts of the motor such as the armature and field may be accessible without disconnecting any of the wires.

Other and further objects will be apparent to one skilled in the art after a study of the specification taken in connection with the annexed drawings which constitute a part hereof, wherein—

Figure 1:
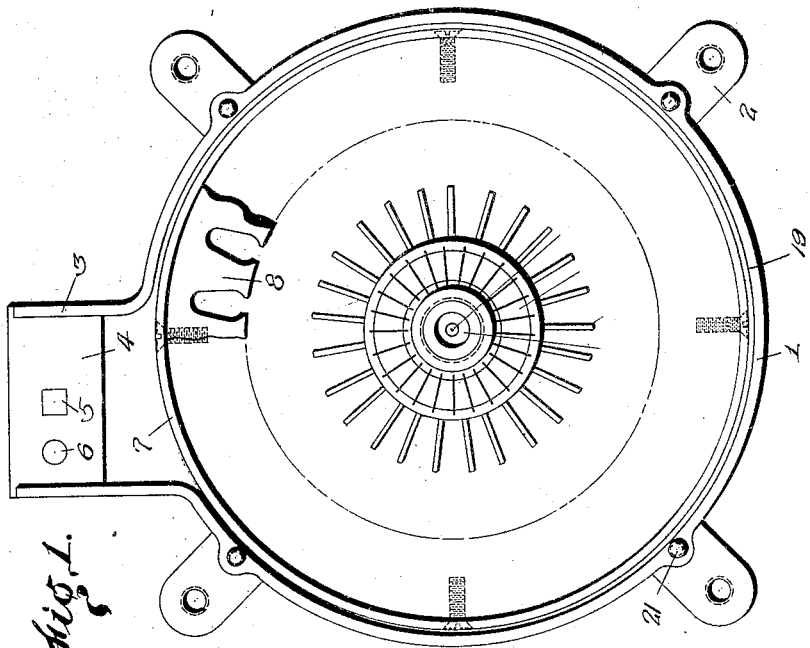
Figure 1 is a plan view on a reduced scale of the stationary casing with the rotating member in position therein.

Referring now to the details wherein like numbers refer to corresponding parts in the various views, 1 is a casing adapted to be mounted through the medium of lugs 2 on the usual mounting board that constitutes a part of the phonograph. Casing 1 has a projection 3 within which is mounted a terminal block 4 having contacts 5 and 6 permanently fastened thereto and to which the electrical connections are made. Mounted for rotation within the casing 1 is a second casing 7 carrying an element 8 of magnetic material. The windings are similar to those shown in my above mentioned application and these windings are connected by the connectors 9 to commutator segments 10. The commutator is carried on a hub of the casing 7 to which is secured the shaft 11, one end of which is positioned in the casing 1 and passes therethrough on the opposite side and is adapted to receive a sound record support body as will be readily understood. The end of the shaft 11 preferably turns on a hardened rounded end 12 which co-operates with a hardened rounded surface 13 carried on the bearing screw 14 which in turn is adjustably carried in the brush holder 15, a nut 16 being illustrated as the locking means.

A flat cover plate 17 has a shoulder 18 adapted to fit the inner edge 19 of the flange on the body casing 1. The cover plate 17 is fastened to the body casing, 1 by any suitable means, such as screws passing through the screw holes 20 which are in turn adapted to co-operate with the threaded holes 21 in the body casing 1. The cover plate 17 has an inwardly projecting hub 22 on which is carried a field ring 23 of magnetic material, the same being held to the hub 22 in any suitable manner as by screws 24. The field ring 23 has field pole teeth 25 and coils 26 similar to those shown in my copending application previously referred to.

Figure 2:
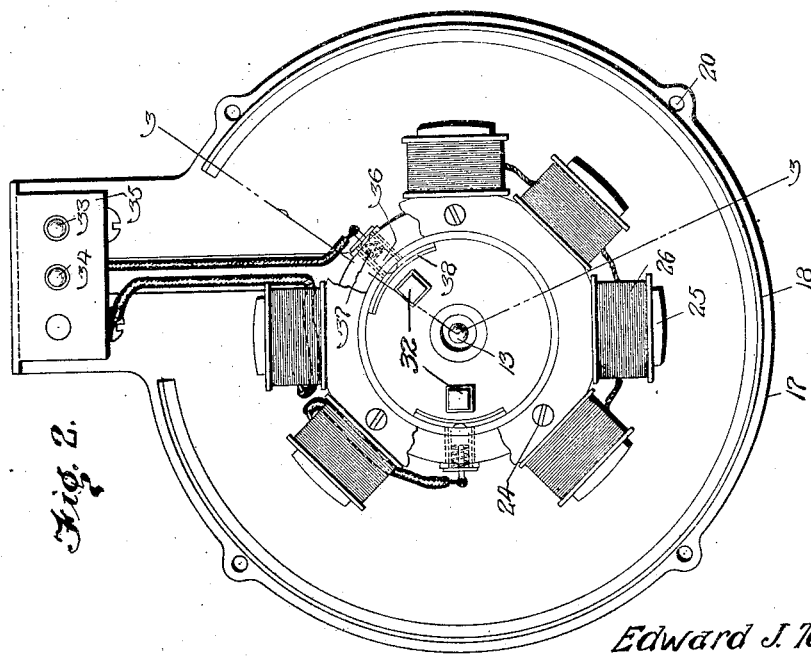
Figure 2 is a plan view of the cover plate as removed from Figure 1 but with two of the field coils removed to show certain of the parts clearly.
Figure 3:
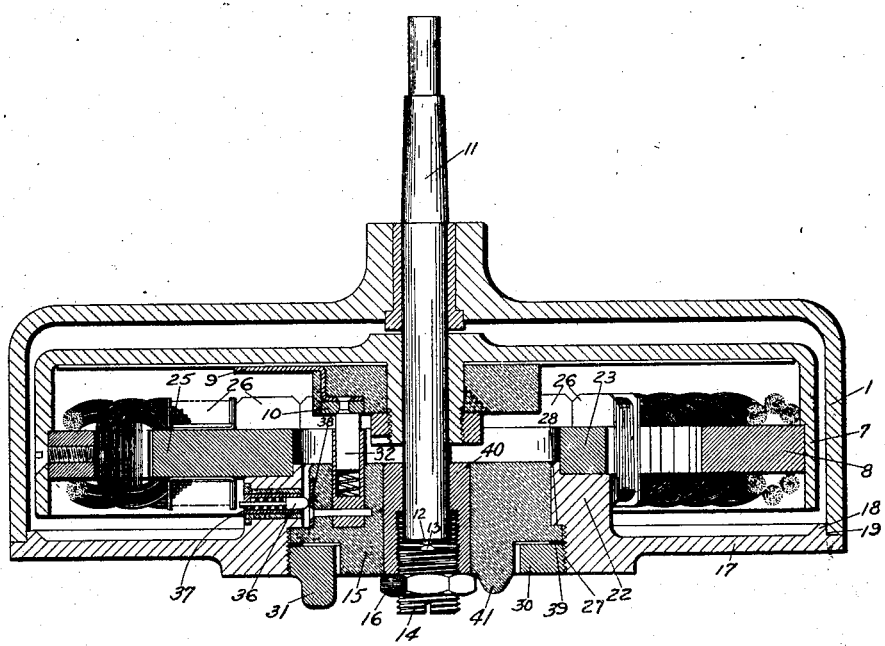
Figure 3 is a section of the assembled motor on the line 3—3 of Fig. 2.
Figure 4:
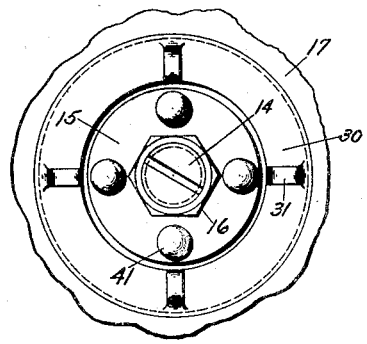
Figure 4 is a fragmentary bottom plan view of the motor.

When in position on the hub 22, the field structure including the ring 23, the poles 25 and coils 26 are in operative relationship with the armature structure 8. The outer end of the hub 22 is threaded at 27 down to a shoulder 28. The brush holder 15 has a flange 29 adapted to engage the shoulder 28 and is held secure against said shoulder by means of an annular ring clamping nut 30 having operating ears 31. This construction of the nut 30 leaves the bearing screw 14 and nut 16 accessible so when it is necessary to adjust or change the bearing screw this can be done without touching the nut 30. Furthermore when it is desired to adjust the brush holder 15 the nut 30 need only be unscrewed slightly and the brush holder can be turned by taking hold of the ears 41 on the brush holder. The holder 15 carries a pair of brushes 32 which are adapted to engage the commutator segments 10, and an electrical connection from the contacts 33 and 34 carried on the block 35 is made with the brushes 32 by means of plunger contacts 36 which are pressed toward the center by springs 37 making contact with segmental contacts 38 electrically connected with the brushes 32. It is to be understood that the plunger contacts 36 move outwardly or toward the center only a certain distance in order that the brush holder 15 may be readily slipped into position as shown in Figures 2 and 3. The segments 38 are of such a length that the brush holder 15 can be rotated to give the proper co-operation between the windings 26 and the armature 8. In fact, I prefer to make them so that the armature 28 may be reversed in rotation for any purpose desired, one of which I have found very entertaining, that is, to play a phonograph record backwards. As far as I know, the phonograph motor described herein is the first that is adapted for this purpose. I have also found that the playing of a record backwards is a good test on the ability of the motor to operate smoothly under fluctuations of voltage for the reason that the rhythm is unusual and the listener is paying closer attention than he otherwise would and, therefore, is able to detect slight variations in its speed, it being understood that the motor described herein is adapted to operate from the usual lighting circuit, either direct or alternating current.

In adjusting the brushes 32 for the best operating position, I have found it advisable to insert a member 39 as shown in Figure 3 between the outer surface of the holder 15, which is preferably of insulating material and the inner surface of the nut 30. The member 39 preferably will take the form of an annular ring or gasket against which the nut 30 clamps and the material should be such that the nut 30 can be turned against the member 39 and pressure applied to the brush holder 15 without any danger of shifting it and the brushes 32. I have found that a gasket of soft copper answers the purpose nicely. The brush holder 15 carries a bushing 40 which acts as a guide for the inner end of the shaft 11, which as has been described takes its thrust against the surface 13. It will be readily seen that the plate 17 can be removed from the body 1 without disconnecting any of the wires, since the electrical control circuits are broken at the contacts 5—6 34—33, one set of which are preferably reciprocal in their action so as to insure a good contact. It will furthermore be seen that by removing the nut 30, that the brush holder brushes, as well as the outer bearing for the shaft can be quickly withdrawn for the purpose of putting in new brushes or reaching through the opening to clean the commutator without in any way disturbing the casing carrying the other operating parts. Since the cover 17 is attached to the bottom of the body 1, it will be further observed that when the mounting plate carrying the entire motor is swung to a vertical position as when pivoted in the phonograph cabinet the brush holder is presented toward the operator which makes it very accessible.

The governor mechanism used for governing a motor of this type may be any desired form and is not illustrated and will not be described herein, but it is to be understood that a governor of some type is to be utilized when the motor is used for playing phonograph records.

It will be further apparent that numerous changes and alterations may be made in the various details of my invention without departing from the spirit of the same and the scope of the appended claims.

Having thus described my invention, what I claim is:—

1. A phonograph motor comprising in combination, a stationary casing, a movable casing positioned within the stationary casing and carrying: an armature structure, a shaft for operating a sound record support body and a commutator; a flat cover plate with means for fastening the same to the stationary casing, said plate carrying a magnetic field structure for co-acting with said armature structure, a brush holder mounted in said flat cover plate with brushes to convey current to and from said commutator and a bearing in the cover plate for one end of said shaft.

2. A phonograph motor comprising in combination, a stationary casing, a movable casing positioned within the stationary casing and carrying: an armature structure, a shaft for operating a sound record support body and a commutator; a cover plate with means for fastening the same to the stationary casing, said plate carrying a magnetic field structure for co-acting with said armature structure and a brush holder removably mounted in the cover plate with brushes to convey current to and from said commutator, said brush holder also carrying a bearing for one end of said shaft.

3. A phonograph motor comprising in combination, a stationary casing, a movable casing positioned within the stationary casing and carrying: an armature structure, a shaft for operating a sound record support body and a commutator; a cover plate with means for fastening the same to the stationary casing, said plate carrying a magnetic field structure for co-acting with said armature structure, a removable brush holder with brushes to convey current to and from said commutator and a bearing for one end of said shaft, said brush holder being adjustable in said plate for shifting the timing between said field and armature structures.

4. A phonograph motor comprising in combination, a stationary casing, a movable casing positioned within the stationary casing and carrying: an armature structure, a shaft for operating a sound record support body and a commutator; a cover plate with means for fastening the same to the stationary casing, said plate carrying a magnetic field structure for co-acting with said armature structure and a brush holder with brushes to convey current to and from said commutator, said brush holder also carrying a bearing for one end of said shaft and being adjustable in a manner such that the longitudinal position of said bearing is not altered.

5. A phonograph motor comprising in combination, a stationary casing, a movable casing positioned within the stationary casing and carrying an armature structure, a shaft for operating a sound record support body and a commutator; a cover plate with means for fastening the same to the stationary casing said plate having a hub projecting inwardly toward said commutator, a magnetic field structure carried on said hub in position to co-operate with said armature, said hub having an interior shoulder, a brush holder positioned within said hub against said shoulder and means for holding said brush holder securely against said shoulder.

6. A phonograph motor comprising in combination, a stationary casing, a movable casing positioned within the stationary casing, and carrying: an armature structure, a shaft for operating a sound record support body and a commutator; a cover plate with means for fastening the same to the stationary casing said plate having a hub projecting inwardly toward said commutator, a magnetic field structure carried on said hub in position to co-operate with said armature, said hub having an interior shoulder, a brush holder positioned within said hub against said shoulder and means for holding said brush holder securely against said shoulder consisting of, threads within said hub adjacent the shoulder and a nut engaging said threads and brush holder on its outer surface.

7. A phonograph motor comprising in combination, a stationary casing, a movable casing positioned within the stationary casing and carrying an armature structure, a shaft for operating a sound record support body and a commutator; a cover plate with means for fastening the same to the stationary casing, said plate having a hub projecting inwardly toward said commutator, a magnetic field structure carried on said hub in position to co-operate with said armature, said hub having an interior shoulder, a brush holder positioned within said hub against said shoulder and means for holding said brush holder securely against said shoulder consisting of, threads within said hub adjacent the shoulder and a nut engaging said threads and brush holder on its outer surface and a member interposed between the outer surface of the brush holder and the nut to prevent turning of the brush holder as the nut is screwed up as described.

8. A phonograph motor comprising in combination, a stationary casing, a movable casing positioned within the stationary casing and carrying: an armature structure, a shaft for operating a sound record support body and a commutator; a cover plate with means for fastening the same to the stationary casing, said plate having a hub projecting inwardly toward said commutator, a magnetic field structure carried on said hub in position to co-operate with said armature, said hub having an interior shoulder, a brush holder positioned within said hub against said shoulder and having a bearing for said shaft centrally located therein and means for adjustably clamping the brush and bearing holder against said shoulder.

9. A phonograph motor comprising in combination, a stationary casing, a movable casing positioned within the stationary casing and carrying: an armature structure, a shaft for operating a sound record support body and a commutator; a cover plate with means for fastening the same to the stationary casing, said plate having a hub projecting inwardly toward said commutator, a magnetic field structure carried on said hub in position to co-operate with said armature, said hub having an interior shoulder and movable electrical contacts positioned in its side wall, a holder carrying brushes and a bearing for said shaft, said holder having contact segments connected to the brushes to flexibly engage the contacts in said hub and means for adjustably fastening said holder within said hub.

10. An electric motor comprising in combination, a stationary casing having electrical contacts positioned thereon, a movable member positioned within the stationary casing and carrying: an armature structure including a shaft with one end positioned in and extending through said casing and a commutator, a cover plate having contacts to co-act with those on the stationary casing, means for fastening the plate to said casing, said plate carrying a magnetic field structure for co-acting with said armature structure, a brush holder carrying brushes to convey current from said plate contacts to and from said armature structure and a bearing for one end of said shaft.

11. An electric motor comprising in combination, a stationary casing having electrical contacts positioned thereon, a movable member positioned within the stationary casing and carrying an armature structure including a shaft with one end positioned in and extending through said casing and a commutator, a cover plate having contacts to co-act with those on the stationary casing, means for fastening the plate to said casing, said plate having an inwardly projecting hub carrying a magnetic field structure for co-acting with said armature structure, a holder for commutator brushes adjustably secured within said hub, automatic engaging means for connecting said brushes and plate contacts when the holder is in working position in the hub and a bearing for one end of said shaft carried by the holder.

12. An electric motor comprising in combination a casing, a cover, an armature structure including a shaft and commutator rotatable in the casing, a field structure and a brush holder having a bearing for the shaft carried by the cover, and co-operating contacts on the casing and cover portions for completing electrical connections whereby the cover including said field structure and brush holder with bearing may be removed from the casing without disconnecting any of the electrical wires.

13. An electric motor comprising in combination a casing, a cover, an armature structure including a shaft and commutator rotatable in the casing, a field structure and a brush holder carrying a shaft bearing and carried by the cover, said brush holder being independently removable from the cover without removing the cover from the body or disconnecting any wires.

14. An electric motor comprising in combination a casing, and a cover enclosing the same, an armature structure including a shaft and a commutator rotatable in the casing mounted on the shaft, and a field structure and brush holder carried by the cover within the casing, said brush holder also carrying a thrust bearing for one end of said shaft.

15. An electric motor having an enclosure including a casing and a plate, an armature including a shaft and commutator, a magnetic field structure and a unitary holder carrying a plurality of brushes with means for mounting the holder in the plate whereby the holder may be removed from the plate without removing the plate from the casing, said holder also carrying a bearing for one end of said shaft.

16. A phonograph motor comprising a casing and a cover enclosing an armature and a field structure, a unitary holder, carrying brushes for conveying current to and from said armature, removably carried by and exteriorly adjustable in the cover, whereby it may be removed and adjusted from the exterior of the casing.

In testimony whereof, I affix my signature.

EDWARD J. TOMLINSON.